July 12, 1955
B. ADLER
2,713,119
SWITCHING EQUIPMENT
Filed July 21, 1952
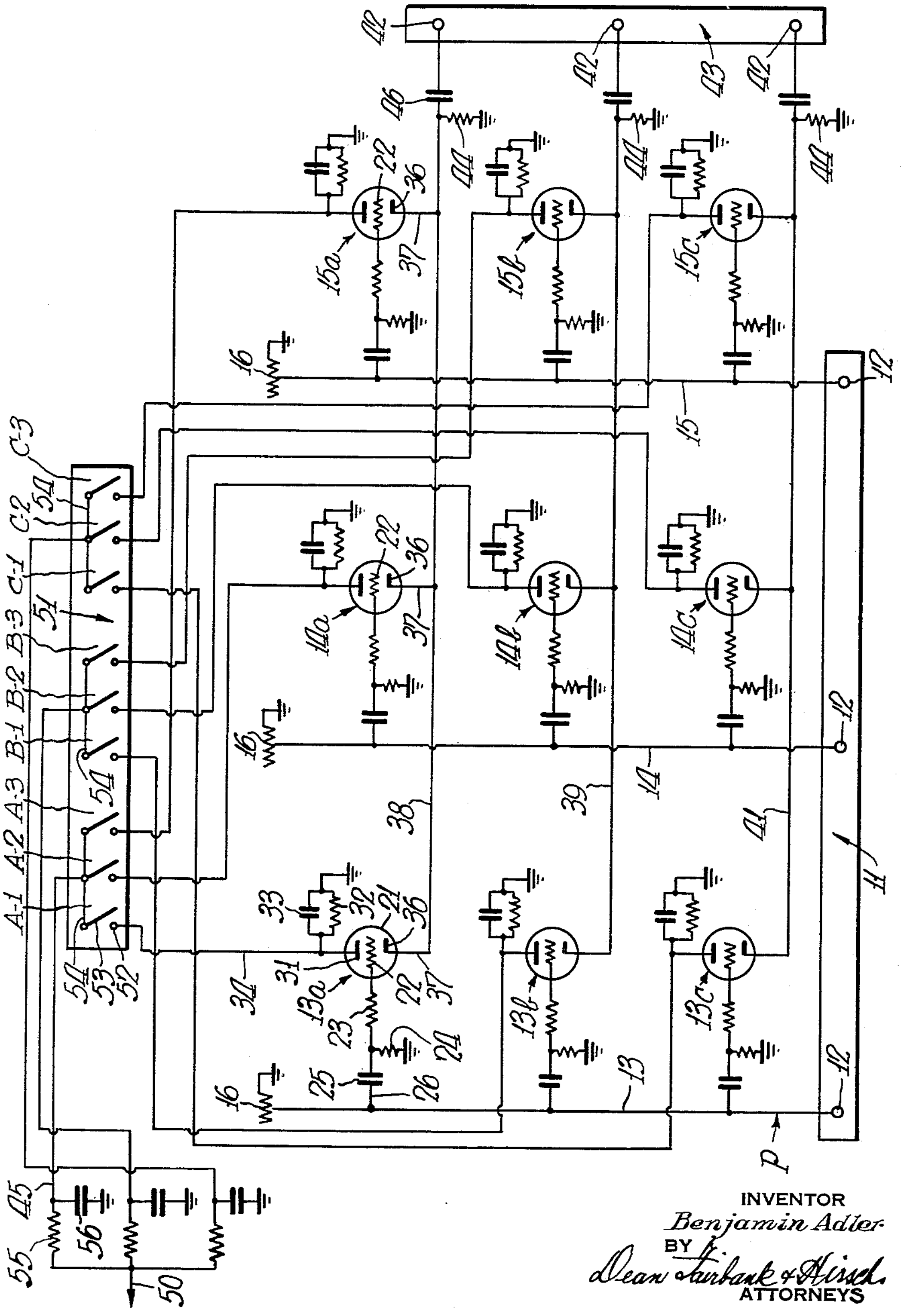
INVENTOR
Benjamin Adler
BY
Dean Fairbank & Hirsch
ATTORNEYS

United States Patent Office 2,713,119
Patented July 12, 1955

2,713,119

SWITCHING EQUIPMENT

Benjamin Adler, White Plains, N. Y.

Application July 21, 1952, Serial No. 300,051
10 Claims. (Cl. 250—27)

This invention relates to switching equipment for alternating current impulses and more particularly for video signals occupying a wide frequency band width and having short duration rise time characteristics such as are encountered in television, radar, or telemetry.

As conducive to an understanding of the invention, it is noted that in a television station with a plurality of studios in which one or more television cameras may be in use at the same time, it is necessary that means be provided to switch the video outputs from any one of such cameras or other video signal source to the television transmitter or to a monitor receiver.

Where mechanical relays, each of which has a pair of contacts, are used to switch any one of a plurality of camera outputs or program source lines to any one of a plurality of output feed terminals, which may be connected to the transmitter, a network line, a video recorder or to monitor receivers, the shunt capacitance of the open contacts of the non-energized relays associated with the signal sources not connected to the output terminals will cause degradation in signal, i. e., loss of high frequencies, with resultant loss of definition in the picture viewed on such television receiver.

In addition, objectionable transients and surges may be caused by said relays due to possible chattering of the contacts thereof with resultant momentary glowing or darkening of the cathode ray tube in the television receiver.

Even assuming that the value of the capacitance placed in circuit by each pair of spaced contacts of the relays is a constant, as the capacitance of a set of closed contacts would be reduced to zero when the associated relay was energized, no fixed compensation can be introduced into video amplifiers placed in the program line. The degree of loss of high frequencies in any one of the signal source buses would vary depending upon the number of feed buses or outputs that are connected to it and for this reason compensation for this loss of high frequencies is highly impracticable where mechanical relays are used.

Even where mechanical relays are used of the type with extremely low capacitance, the cumulative effect of a large number of small shunt capacitances would limit the number of program lines that could be utilized by reason of the frequency degradation. In addition, such relays are relatively expensive and are subject to pitting of the contacts, wear and other mechanical disturbances which require a great deal of repair with resultant need for considerable skilled maintenance personnel.

Where a series of television cameras are utilized in one studio, it is customary in the television industry when switching from one to another camera to provide a slight overlap in the signals from the cameras. It is also customary where composite signals are used which comprise both a video and synchronization signal, when it is desired to switch from one to the other of two composite signals from say two studios, to provide a slight interval of time or gap between the cutoff of the signal from one studio to the transmitter to the connection of the signal from the other studio. Where mechanical relays are utilized for timing either the lap or gap switching, such relays are difficult to adjust and often become out of order with resultant failure in producing the desired lap or gap.

Where a plurality of output buses are successively connected to a single input bus and each parallel output loads the circuit by decreasing its impedance, the signal level to the output buses will be reduced as they are connected in circuit.

It is accordingly among the objects of the invention to provide a system which permits the switching of a large number of program lines to a large number of output lines without any substantial degradation of frequency response and which permits compensation to be introduced into video amplifiers placed in the program lines so that there will be no loss of high frequencies thereby insuring a picture on a television receiver having good definition, which system upon selection of any program line and connection of such line to an output line will provide for substantial isolation of the other program lines associated with such output line thereby substantially preventing leakage of unselected signals into such output line with resultant elimination of interference or noise caused by such leakage, in the picture received on the television receiver, which system is devoid of any mechanical relays and may readily be modified so that either a gap or a lap may be effected between two signals successively impressed upon the output line and which substantially eliminates switching surges and transients in the signal fed to the transmitter which might cause momentary glaring or darkening of the cathode ray tube, which permits the switching of a large number of output lines to a single input line without loss in the signal level on the television receiver, and which is neat, compact, utilizing relatively low cost components which may readily be installed and are not likely to become out of adjustment even with long use.

According to the invention, the switching system comprises a plurality of program input lines and a plurality of output lines. A plurality of vacuum tubes are provided corresponding in number to the product of input and output lines, and desirably arranged in columns and rows associated respectively with each of the program lines and with each of the output lines. Desirably the grids of the tubes in each column are connected to the associated input line and the cathodes of the tubes in each row are connected directly to the associated output line, each output line having a resistor connected at one end thereto and at its other end to ground to serve as the common cathode resistor of all of the vacuum tubes connected to said output line. Each of the plates of the tubes is desirably connected to one end of a parallel resistor-capacitor circuit, the other end of which is connected to ground. Each of the plates of the tubes is also connected to one of the contacts of a single pole, single throw switch, the other contact of which is connected to a source of positive plate potential. Desirably the switches associated with each of the rows of vacuum tubes are so designed that when one of the switches is actuated it will break the circuit from the power supply to the plate of a previously conducting tube before it connects such power supply to the plate of the tube associated with the actuated switch.

In the accompanying drawing in which is shown one or more of various possible embodiments of several features of the invention, the single figure is a circuit diagram illustrating the switching system.

Referring now to the drawings, the switching equipment desirably comprises an input strip 11 having a plurality of terminals 12 thereon to which may be connected respectively the programs or outputs of a corresponding plurality of television cameras for example.

Each of the terminals 12 desirably has a program bus P connected at one end thereto against ground, three of said buses being illustratively shown, arranged in three columns and designated by the numerals 13, 14 and 15, it being understood that any desired number of buses P could be provided. Desirably each bus is terminated at its other end by a suitable resistance 16 of ohmic value corresponding to the characteristic impedance of the line, in the illustrative embodiment herein shown, the resistance 16 having a value of 75 ohms.

Connected to each of said program buses 13, 14 and 15 are a plurality of vacuum tube switches, in the illustrative embodiment shown, three switches being connected to each of the program buses and designated 13*a*, 13*b*, 13*c*; 14*a*, 14*b*, 14*c* and 15*a*, 15*b*, 15*c*. Each vacuum tube switch desirably comprises a vacuum tube 21, illustratively a triode, having its grid 22 connected to one end of a parasitic oscillation suppressor resistance 23, illustratively of 100 ohms, the other end of which is connected through grid resistance 24, illustratively of 470,000 ohms to ground, and to one side of a capacitor 25, illustratively of .5 mf., the other side of which is connected by lead 26 to the associated bus 13, 14 or 15 as the case may be. The plate 31 of each tube 21 has an R-C circuit associated therewith. This circuit desirably comprises a resistance 32 and a capacitance 33 illustratively of 22,000 ohms and 1 mfd. respectively connected in parallel, one end of said parallel circuit being connected to plate lead 34 and the other end of said parallel circuit being connected to ground.

The cathodes 36 of the three rows of vacuum tubes associated with the buses 13, 14 and 15 are connected by leads 37 to output buses 38, 39 and 41 respectively, said output buses being connected at their ends to feed terminals 42 on an output strip 43, said terminals 42 desirably having a suitable unit such as a television transmitter connected thereto.

Each of the output buses desirably has a resistor 44, illustratively of 360 ohms, connected at one end thereto, the other end of said resistor being connected to ground, said resistor desirably functioning as the common cathode resistor for the cathodes 36 of all of the vacuum tubes 21 connected to the associated output buses 38, 39 or 41 as the case may be. A capacitor 46 desirably having a value of 6,000 mfd. is interposed in series with each output bus between resistor 44 and feed terminal 42.

Each of the plurality of plate leads 34 of the vacuum tubes 21 is connected respectively to a corresponding plurality of switches on a suitable control panel 51. The switches which are designated A–1, A–2, A–3; B–1, B–2, B–3; C–1, C–2, C–3 corresponding in number to the number of vacuum tubes 21, each has a fixed contact 52 and a movable contact arm 53 associated therewith. The switches are arranged in sets corresponding to the number of program buses, three sets being illustratively shown. The switches in each set are desirably of the conventional push-button type so designed that only one switch can be closed at a time, said switch not closing until the previously actuated switch in the set has opened. Each of the contact arms 53 of each set of switches is desirably connected to a common lead 54 and leads 54 are connected respectively by leads 45 through resistance 55, illustratively of 3,000 ohms, to a source of positive potential 50, illustratively in the order of 150 volts. Desirably, a capacitor 56, having a value of 16 mfd., is associated with each line 45 being connected at one side thereto and at its other side to ground, said capacitor being positioned between the associated resistance 55 and common lead 54.

*Operation*

In the operation of the equipment above described, a television camera or other source of video signal may be connected to each of the terminals 12 on the input strip 11 and a transmitter may be connected to each of the output feed terminals 42 on the output strip 43. Assuming that it is desired to feed the signal from the television camera connected to terminal 12 of program bus 13 to the television transmitter connected to terminal 42 of output bus 38, the operator at the control panel need merely close the switch A–1 to bring movable arm 53 thereof into engagement with fixed contact 52. As a result, a circuit will be completed from positive main 50 through resistance 55, lines 45 and 54, closed contacts 53, 52, lead 34 to plate 31 of tube 21 of vacuum tube switch 13*a* associated with buses 13 and 38. When the switch A–1 controlling such vacuum switch 13*a* is closed, the impedance between plate to ground of the associated tube 21 is zero due to the uncharged condition of the shunt capacitor 33 at that instant. By reason of the resistance 55 in the plate circuit, a voltage drop will be developed thereacross which will prevent injury to the power supply which in the absence of the resistance 55 might occur by reason of the instantaneous short circuit developed when the uncharged capacitor 33 is initially placed in circuit. The capacitor 56 serves to bypass alternating currents to ground.

The voltage across capacitor 33 then rises exponentially until it reaches its steady state value and the capacitor is charged, and since the plate current approximately follows the plate voltage, the current through tube 21 of vacuum tube switch 13*a* will also rise exponentially.

Due to such application of plate voltage to vacuum tube switch 13*a* and flow of current through the associated tube 21, current will flow through the common cathode resistance 44 with a resultant voltage drop across such resistance to provide bias for the tube. As an input signal from the bus 13 in the order of 1.4 volts peak to peak is constantly impressed on the grid 22 of such tube 21, through bus 13, lead 26, capacitor 25 and resistance 23, such input signal will cause variations in the flow of current through tube 21 which variations will appear as voltage fluctuations across cathode resistance 44, the voltage across resistance 44 being approximately 2 volts.

Inasmuch as tube 21 is functioning as a cathode follower, the signal across resistance 44 will be in the same phase as the signal impressed upon the grid 22 of tube 21, and this signal is available at the feed terminal 42 of output strip 43 associated with bus 38. It is to be noted that a signal in the order of 1.4 volts peak to peak is also present on the grids 22 of the other tubes 21 of vacuum tube switches 14*a* and 15*a* connected to bus 38 from buses 14 and 15, for example. Although the plates 31 of such tubes are not connected to the B+ power supply 50 due to the open switches A–2 and A–3 associated therewith, in the absence of the common cathode resistance 44, the grids 22 and cathodes 36 of such tubes would function as diodes so that current would flow from the positive grid 22 to the cathode 36 to be impressed on the terminal 42 associated with bus 38. Substantially complete isolation of the non-selected vacuum tube switches 14*a* and 14*b* is, however, assured by the presence of such common cathode resistance 44 and by the switching arrangement which only permits the power supply to be connected to the plate of one of the tubes 21 in the horizontal row connected to bus 38.

Thus, as a result of current flowing through resistance 44, the voltage drop across such resistance which is in the order of approximately two volts, will apply a positive potential to the cathodes 36 of the non-selected tubes 21 of vacuum tube switches 14*a* and 15*a* which is greater than the maximum positive potential applied to the grids 22 of such tubes due to the 1.4 volt peak to peak signal impressed thereon. Consequently, the grids of the non-selected tubes will be negative with respect to the cathodes and the non-selected tubes will be cut off and the grid-cathode elements will not function as a diode. It has been found by actual measurement with circuit components of the values above mentioned, that the isolation produced by a non-conducting vacuum tube switch is better than 46 db. By reason of the resistance 23 in series with the grid 22, if there should be a slight current flow in the non-selected tubes, the voltage drop across resistance 23 would substantially reduce any "cross talk."

Assuming that it is desired to connect the signal from program bus 14 to output bus 38, it is merely necessary for the operator to press the push-button controlling switch A–2. As the result, the switch A–2 will be closed and switch A–1 will be opened, the switch A–1 opening before switch A–2 closes. The closing of switch A–2 will complete a circuit from the B+ power supply 50 to the plate 31 of tube 21 of vacuum tube switch 14*a* and the capacitor 33 will charge exponentially until it reaches its steady state value.

Although the plate 31 of tube 21 of vacuum tube switch 13*a* has been disconnected from the power supply 50, by reason of the charge of the capacitor 33 associated therewith, the plate 31 of such tube will have potential applied thereto until such capacitor 33 discharges through resistor 32 to ground. Such discharge of capacitor 33 of tube 21 of vacuum tube switch 13*a* will start before the capacitor 33 of vacuum tube switch 14*a* starts to charge by reason of the construction of the switches A–1, A–2 and A–3, etc. which causes the previously actuated switch in each set to open before the actuated switch closes.

The value of capacitor 33 can be regulated so that before tube 21 of vacuum tube switch 14*a* conducts, tube 21 of vacuum tube switch 13*a* can be made to cut off so that a gap can be effected between the time that the first tube cuts off and the second tube conducts. Similarly, capacitor 33 can be regulated so that before tube 21 of vacuum tube switch 13*a* cuts off, tube 21 of vacuum tube switch 14*a* can be made to conduct so that two signals will be impressed simultaneously on line 38 during the switching interval.

Assuming that it is desired to connect the signal from one of the program buses, i. e., bus 13 to a number of output lines, i. e., lines 38 and 39, it is merely necessary to close switches A–1 and B–1. As the input impedance of the vacuum tubes 21 remains at a constant high value as compared to the impedance of the signal source bus P, the signal level to each of the output terminals 42 will also remain substantially constant regardless of the number of such output terminals that are connected to program bus 13.

By reason of the substantially constant input capacitance of the vacuum tubes regardless of whether they are conducting or not, a conventional video amplifier connected to each of the terminals 42 in series with the transmitter may be adjusted with fixed compensation to offset the loss of high frequencies due to the total shunt capacitance of the plurality of vacuum tube switches. Once the amplifier is adjusted, as the shunt capacitance of the tubes remains substantially constant, regardless of whether they are conducting or not, no frequency degradation will occur with switching.

As the vacuum tube switches are of relatively low cost, the overall cost of the equipment is considerably less than if mechanical switching relays were used. Also, as the vacuum tubes preferably are of the plug-in type, they may readily be replaced in the event of failure.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patents of the United States is:

1. Switching equipment comprising a plurality of input lines, a plurality of output lines, a plurality of vacuum tubes arranged in rows and columns associated respectively with said output lines and said input lines, each of said tubes having an input electrode connected respectively to the associated input line and an output electrode connected respectively to the associated output line, and a third electrode, means to make said output electrode positive with respect to said input electrode to prevent flow of current therebetween and means to apply a positive potential to said third electrode for flow of current between said output electrode and said third electrode whereby a signal impressed on the input electrode from the associated input line will be impressed on the output electrode and the associated output line.

2. Switching equipment comprising a plurality of input lines, an output line, a plurality of vacuum tubes corresponding to the number of input lines, each of said tubes having a control grid connected to the associated input line, a cathode connected to said output line and a plate, a common biasing resistance for the cathodes of all of said tubes connected to said output line and means to apply a positive potential to the plate of one of said tubes whereby upon application of a signal to said input lines only the tube connected to said source of positive potential will conduct, the current flowing through said conducting tube and said output line developing a potential across said biasing resistance to render the cathodes of the non-conducting tubes positive with respect to their associated grids to prevent flow of current from such grid to such cathode.

3. The combination set forth in claim 2 in which each of said input lines is terminated with a resistance equal to the characteristic impedance of the line.

4. The combination set forth in claim 2 in which a parallel connected resistor capacitor unit is provided for each of said tubes, one end of said resistor capacitor unit being connected to the plate of the associated tube and the other end of said unit being connected to the return of the source of positive potential.

5. The combination set forth in claim 2 in which a parallel connected resistor capacitor unit is provided for each of said tubes, one end of said resistor capacitor unit being connected to the plate of the associated tube and the other end of said unit being connected to the return of the source of positive potential, and a voltage dropping resistance is connected in series with the plate of the tube.

6. The combination set forth in claim 2 in which a parallel connected resistor capacitor unit is provided for each of said tubes, one end of said resistor capacitor unit being connected to the plate of the associated tube and the other end of said unit being connected to the return of the source of positive potential, a plurality of switches are provided corresponding to the number of vacuum tubes, each switch having a pair of contacts, one of said contacts being connected in series with the plates of each of said tubes, the other of said contacts of each of said switches having one end of a voltage dropping resistor connected thereto, means being provided for connection of the other end of said resistor to a source of positive potential.

7. The combination set forth in claim 6 in which said switches are interconnected so that when one of said switches is actuated it will not close until the previously actuated switch has opened whereby the source of potential can be applied to the plate of only one of the tubes associated with the output line at any given time.

8. The combination set forth in claim 7 in which the value of said resistor capacitor unit is such that the capacitor associated with one of the tubes will discharge to reduce the plate potential below that required for current flow through such tube before the capacitor associated with another tube charges to a value sufficiently high to apply plate potential to cause current flow through the associated tube.

9. The combination set forth in claim 7 in which the value of said resistor capacitor unit is such that the capacitor associated with one of the tubes will not discharge to reduce the plate potential below that required for current flow through such tube until the capacitor associated with another tube charges to a value sufficiently high to apply plate potential to cause current flow through the associated tube.

10. Switching equipment comprising a plurality of input lines, an output line, a plurality of vacuum tubes corresponding to the number of input lines, each of said tubes having an input electrode connected respectively to said input lines, an output electrode connected to said output line, and a third electrode, means to make said output electrode positive with respect to said input electrode to prevent current flow therebetween, and means to apply a positive potential to said third electrode for flow of current between said output electrode and said third electrode whereby a signal impressed on the input electrode from the associated input line will be impressed on the output electrode and the output line, in which the means to apply a positive potential to said third electrode comprises a switch associated with each of said third electrodes, and means are provided interconnecting said switches so that a previously actuated switch will open before a presently actuated switch closes.

References Cited in the file of this patent

UNITED STATES PATENTS

| | | |
|---|---|---|
| 1,873,785 | Ranger | Aug. 23, 1932 |
| 2,454,191 | Macdonald | Nov. 16, 1948 |
| 2,535,377 | Titterton | Dec. 26, 1950 |
| 2,535,912 | Frank et al. | Dec. 26, 1950 |
| 2,586,151 | Costello | Feb. 19, 1952 |